March 13, 1928. 1,662,557

J. ZUBATY

SPEEDOMETER DRIVE ON PROPELLER SHAFTS

Filed Jan. 29, 1926

Inventor
Joseph Zubaty
By Blackmore, Spencer & Hulit
Attorneys

Patented Mar. 13, 1928.

1,662,557

UNITED STATES PATENT OFFICE.

JOSEPH ZUBATY, OF FLINT, MICHIGAN, ASSIGNOR TO A C SPARK PLUG COMPANY, OF FLINT, MICHIGAN, A COMPANY OF MICHIGAN.

SPEEDOMETER DRIVE ON PROPELLER SHAFTS.

Application filed January 29, 1926. Serial No. 84,790.

This invention relates to an improved means for driving a speedometer shaft from the transmission shaft of a motor vehicle. It will be understood however that it is not limited to this specific application for which it is primarily designed, but that the invention may be found useful in driving other instruments and in other relations than that on motor vehicles.

It is an object of the invention to make a novel form of driving gear by a simple stamping process. A further object is to make this stamping in the form of cooperating parts such that the gear may be readily assembled upon the transmissin shaft. A further object is to so position such a gear with relation to the sleeve and clutch spring of a conventional transmission, that the gear may be easily assembled between the spring and flange of the sleeve without disturbing any of the parts, removal of the cover giving access to the gear case for the purpose of assembling the driving gear.

Another object which the invention accomplishes is the removal of a driven pinion together with the cover, thereby making a convenient means for assembly and disassembly both of the gear and of the driven pinion. Also by this provision the driven pinion is not in the way when the cover is removed to assemble, or remove the drive gear or to make any repairs relating to the transmission.

The following description will give an understanding of the structure shown in the accompanying drawing used to illustrate one embodiment of the invention.

Figure 1:
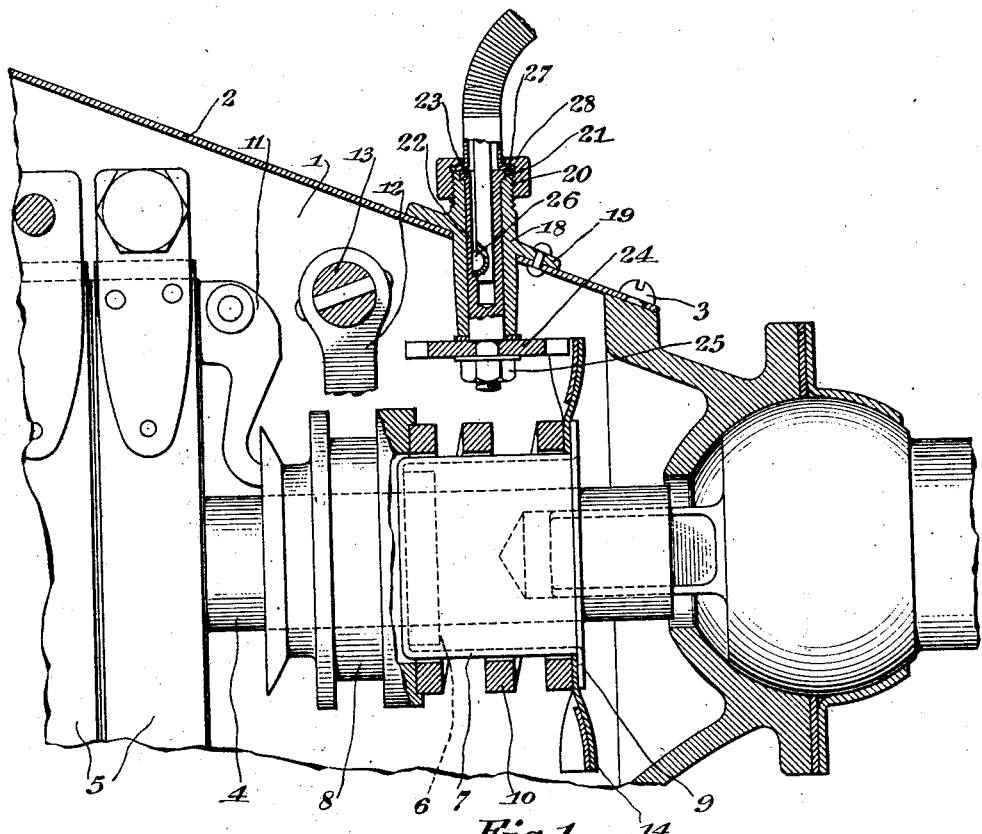
Figures 2, 3, 4:
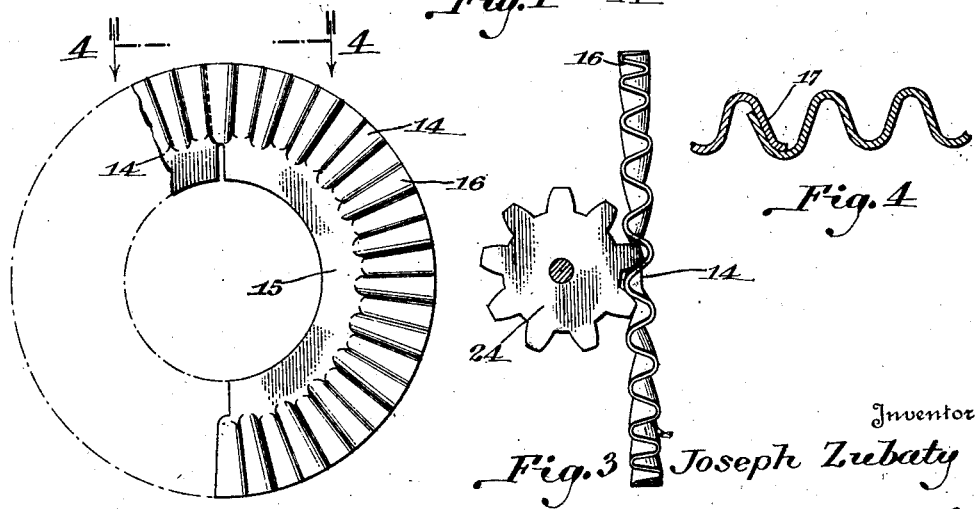

In the drawing, Figure 1 shows a vertical section of a transmission housing of a motor vehicle with the take off device for rotating the flexible speedometer shaft applied thereto. Figure 2 is a side view of a two part stamped driving gear. Figure 3 is a top plan view looking down upon the driven gear and the cooperating driving gear. Figure 4 is an edge view of the driving gear as seen from line 4—4 in Figure 2.

Referring to the drawing, numeral 1 represents a transmission housing of a motor vehicle upon which is secured a cover plate 2 by fastening means 3. Within the housing 1 is shown the transmission shaft 4. This shaft is driven by the motor (not shown) through the means of a transmission device, this transmission device being of the planetary type, two of the bands being shown by numerals 5. From the rear end of the transmission housing the power is transferred by means of a universal joint to the rear axle. This rear end transmission is no part of our invention and need not be further described. Fixed to the transmission shaft 4 is a pin 6. Engaging over this collar 6 is a flanged sleeve 7. Slidable upon the transmission shaft is a collar 8. Between the flange 9 of the sleeve 7 and the sliding collar 8 is a heavy coil spring 10. This coil spring normally functions to press sliding collar 8 forward and to cause the engagement of the clutch plates through the means of lever 11. It will be understood that the collar 8 is moved in an opposite direction by arms 12 carried on the shaft 13 which is actuated by a clutch pedal, not shown.

It is proposed by this invention to make use of the pressure exerted by this spring 10 against collar 9 for holding the driving gear in position. This driving gear, as will be seen from Figure 2, is a two part stamping. Each half member 14 is stamped as shown in Figure 2, so that its inner portion 15 may lie flat against flange 9 and be held firmly in position by the pressure of spring 10. The outer portion of the stamping is made in wave form, as at 16, or crimped in such a way as to constitute, in effect, driving teeth. It will be seen from examination of Figure 2, and perhaps better from Figure 4, that the end teeth of these half members overlap in a way to properly position the halves relative to each other as at 17. Inasmuch as the driving gear is made in sections, as described, it will be understood that the assembly is easily made when cover plate 2 is removed, it being merely necessary to compress slightly spring 10 and insert the two half gear members into position where their teeth overlap as explained above.

Secured to the cover plate 2 in any convenient way is a sleeve member 18 having a flange 19 engaging the cover plate. The upper end of the sleeve is externally threaded as shown at 20 and there is an annular recess as shown at 21. Extending through the sleeve is a drive shaft 22 having at its upper end an annular flange 23 engaging in the recess 21. By this arrangement, when the shaft 22 is inserted in the sleeve, the flange 23 engaging in the recess 21 holds the drive shaft 22 from inward movement through the sleeve. Mounted on the end of drive shaft 22 is a driven pinion 24. This is held into position by nut 25. The shape of the teeth of pinion 24 is such as to make driving engagement with the teeth of the driving gear. A flexible drive shaft for the speedometer is keyed to the drive shaft 22 as shown at 26. The casing for the flexible shaft has at its end a flange 27. This flange holds a nut 28 which threads over the external threads of sleeve 18. This arrangement secures the flexible transmission drive shaft to the transmission housing.

Without further explanation it will be seen that upon the removal of the cover 2 the gear elements 15 can readily be assembled beneath spring 10 and that upon the replacement of the cover the gear 15 is in position for driving pinion 24 and the speedometer shaft.

I claim:

1. A gear composed of a plurality of adjoining parts, crimped teeth on the outer periphery thereof, the end teeth of the parts interengaging to make a complete gear.

2. In a power take off device, a transmission device including a flanged cup, a plurality of gear elements, each with crimped edges to form teeth, the end teeth of the gear elements overlapping to complete the gear, a spring surrounding the cup and holding the gear parts in assembled relation against the cup flange.

3. In a transmission device, a rotary member having a flange, a gear comprised of sections positioned against said flange, yielding means to hold said sections axially against said flange, the sections having parts held in interlocking engagement by said yielding means to prevent radial separation of said sections.

4. In power take-off device, a transmission member including a flanged cup, a plurality of gear sections constituting a gear positioned against said cup flange, a spring exerting axial pressure to hold said sections against said flange, the sections having inter-engaging crimped parts serving to hold said sections from radial separation when held together by the action of said spring.

In testimony whereof I affix my signature.

JOSEPH ZUBATY.